3,038,911
FLUIDITY CONTROL OF FLUIDIZED VANADIUM OXIDE CATALYSTS IN THE PREPARATION OF PHTHALIC ANHYDRIDE
Donald J. Berets and Raymond A. Hermann, Stamford, Conn., and Harry A. Van Brocklin, Pittsburgh, Pa., assignors to American Cyanamid Company, New York, N.Y., a corporation of Maine
No Drawing. Filed Aug. 5, 1959, Ser. No. 831,723
7 Claims. (Cl. 260—346.4)

This invention relates to the vapor phase catalytic oxidation of oxidizable organic compounds in the presence of a bed of fluidized particles of a suitable vanadium oxide-containing catalyst. More particularly the invention deals with fluidization problems that are sometimes encountered after such catalysts have been in long-continued use.

Experience has shown that the most efficient fluidized catalysts for oxidizing organic compounds are those wherein a catalytic mixture of vanadium oxide and an alkali metal sulfate are impregnated into the pores of a porous inorganic carrier such as a hydrous oxide gel or a ceramically bonded silicon carbide. Catalysts of this type that are particularly designed for the catalytic air oxidation of naphthalene to phthalic anhydride may contain a mixture of about 3% to 25% by weight of vanadium oxide and about 20% to 50% of a potassium sulfate on about 35% to 70% of a silica gel as is described in U.S. Patent No. 2,698,330. Catalysts to be used for oxidizing anthracene to anthraquinone, for oxidizing benzene, toluene or xylenes to maleic anhydride and for other organic oxidations are described in U.S. Patent No. 2,783,249.

Fluidizable catalysts of these types are always in finely divided form; usually not more than 10% is coarser than 100 mesh and the major portion is between 200 mesh and 325 mesh, or smaller. They are maintained as a fluidized bed by the upward passage of a stream of reaction gases, usually a mixture of an oxidizable organic compound and air, at velocities of about 0.5 to 4 feet per second using a bed height or thickness such as to secure the optimum contact time. Fluidized catalysts containing $V_2O_5$ or a mixture of $V_2O_4$ and $V_2O_5$ as the principal oxidant are usually operated for organic oxidation reactions at temperatures of from about 300° to 450° C.

When the above-described catalysts in freshly prepared condition are blown into a catalytic converter and heated to reaction temperature it is not difficult to obtain a satisfactory degree of fluidization. The catalyst particles readily form a homogeneous dense phase bed through which the rising reaction mixture passes uniformly and without bumping or slugging. After long-continued use in an organic oxidation process, however, "sticking" or loss in fluidizability of the catalyst is often noted. When this occurs serious operating difficulties are encountered such as a lowering of the heat transfer coefficient, loss of catalyst bed height and irregular conversions due to channeling of incompletely reacted gases through the bed, and eventually a complete loss of fluidization may result.

Our present invention is based on a discovery of the cause of this loss in fluidizability of the catalyst and of a method for correcting it. Preliminary investigations had shown us that the loss in fluidizability occurred only at the elevated oxidation temperatures; the same catalysts were easily fluidized at room temperature. We then found that there was a direct correlation between the pore volume and surface area of the catalyst and its "stickiness" or decrease in fluidizability at elevated temperature; a used catalyst having a low pore volume was much more likely to agglomerate than one in which the pore volume was higher. From these considerations, taken with the fact that the catalytic mixtures of vanadium oxide and potassium sulfate or other alkali metal sulfate used in oxidation catalysts have low melting points, we concluded that the decreases in fluidizability were due to increased cohesiveness of the outer surfaces of the catalyst particles caused by the presence thereon of molten vanadium oxide-salt mixture exuded from the carrier pores.

Fluidizability losses therefore occur by the following mechanism. The pores of the carrier can no longer hold all of the vanadium oxide-salt mixture after it has melted and expanded at reaction temperatures. This failure may be due to a decrease in pore volume of a silica gel or alumina gel carrier upon aging or to an increase in the volume of the salt mixture, as by absorption of sulfur trioxide or other impurities during use, or to both causes. The excess molten vanadium oxide-salt mixture exudes from the carrier pores and moistens the outer surfaces of the catalyst particles, thus increasing their cohesiveness. The moist particles tend to stick together at operating temperatures but when the catalyst is cooled the salt mixture freezes and its outer surfaces are dry.

Having found that cohesion of the catalyst particles at high temperatures was caused by excess molten catalytic material on their surfaces we found that the condition could be corrected by incorporating a powdered absorbent solid material into the fluidized catalyst bed. We found that such a material would take up the excess molten salt mixture from the surfaces of the catalyst and thereby maintain them in a substantially dry condition. We also discovered that by using a porous inorganic solid identical with or similar to the catalyst carrier substantial quantities up to about 15%–20% by weight of diluent solids could be added without materially decreasing the catalyst activity. For example, by adding up to about 5–6% of powdered silica to a naphthalene oxidation catalyst containing about 10% of vanadium oxides, 46–47% of $K_2S_2O_7$ and the balance silica gel, prepared as described in U.S. Patent No. 2,698,330, stickiness during the subsequent manufacture of phthalic anhydride was overcome for a considerable time without any substantial loss in production capacity.

Our invention in its broader aspects therefore consists essentially in an improvement in the vapor phase catalytic oxidation of oxidizable organic compounds such as naphthalene, anthracene, toluene, acenaphthene, methanol and the like wherein vapors of these compounds in admixture with air or other oxidizing gas are reacted in the presence of a fluidized bed of a catalyst containing vanadium oxide and an alkali metal sulfate impregnated into the pores of a porous inorganic carrier, the improvement consisting in extending the useful life of the catalyst by incorporating a sufficient quantity of a powdered absorbent solid into the catalyst bed to take up molten salt mixture from the exterior catalyst surfaces and thereby maintain them in a substantially dry condition. The invention is particularly well adapted for use in controlling the cohesiveness of the catalyst particles of a fluidized bed of vanadium oxide-potassium pyrosulfate catalyst impregnated into the pores of a silica gel carrier and used for the oxidation of a mixture of about 1–3.5 mole percent of naphthalene with 99–96.5% of air at about 320°–425° C. for the production of phthalic anhydride. Such catalysts usually contain a catalytic mixture of about 5–15% of vanadium oxides expressed as $V_2O_5$ and about 35–50% of potassium pyrosulfate impregnated into a silica gel carrier; the catalytic mixture becomes molten at a temperature slightly above 300° C. and loss of fluidizability may occur at any operating temperature from about 330° C. upwards. Adequate fluidization can usually be regained in such catalysts by incorporating therewith from about 1% to 6% of powdered silica gel or other absorbent solid, the exact amount depending on several factors including the ratio of $V_2O_5$ to $V_2O_4$ in the catalyst, the ratio of vanadium oxides to potassium sulfate and the pore volume of the silica gel carrier.

Any absorbent solid may be used that does not poison or otherwise deteriorate the catalyst. The preferred solids are the hydrous oxide gels of silica, alumina, titania, chromia, iron and other gel-forming metals. Mixtures of such gels and cogelled or other mixed gels may be employed such as the silica-alumina gel mixtures used as petroleum cracking catalysts and described, for example, in U.S. Patent No. 2,478,519. Other absorbent solids include natural silicas such as diatomaceous earths, absorbent clays such as the montmorillonites, potassium aluminate silicates and other zeolites and the like.

The most important practical advantage of the present invention is that it can be used to extend the effective life of a vanadium oxide-alkali metal sulfate catalyst far beyond its normal span. The number of days or weeks during which such a catalyst can be used without encountering loss of fluidizability and the attendant difficulties outlined above will of course depend largely on the operating conditions employed. However, for any such set of operating conditions the useful life of the catalyst can be lengthened by incorporating therein a powdered absorbent solid such as silica gel.

The invention is preferably practiced by adding the powdered solid in relatively small increments from time to time after fluidization difficulties are first encountered; for example, the incorporation of about 1% to 3% of powered silica gel into the naphthalene oxidation catalyst described above will usually offset or postpone fluidization difficulties for some 2–3 weeks or longer when this catalyst is operated at the temperatures and under the loadings normally used in producing phthalic anhydride. After the first extension another 1–3% of powdered absorptive solid may be added to obtain a second 2–3 weeks extension and this may be repeated until the diluting action of the added solid decreases the overall activity of the catalyst to an undesired extent. Other procedures for utilizing the principles of the invention in the commerical operation of such fluidized vanadium oxide catalysts will readily be suggested to those skilled in the art by the foregoing descriptions and by the following specific examples.

Any convenient procedure may be used for incorporating the powdered absorbent solid into the catalyst. It may be mixed mechanically with the powdered vanadium oxide catalyst before the latter is blown into the reaction chamber or it may be injected into the air stream passing upwardly through the catalyst bed. The quantity to be used to correct any given deficiency of fluidization of an operating catalyst can readily be determined by inspection and by measuring the stickiness of the catalyst during use, and therefore is under the control of the operator.

The invention will be further described and illustrated by the following specific examples to which, however, it is not limited.

EXAMPLE 1

A catalyst used commercially for the vapor phase oxidation of naphthalene to phthalic anhydride consists of a potassium pyrosulfate-vanadium oxide mixture impregnated on a silica base. The analysis of a typical sample is as follows:

| | |
|---|---|
| Percent $V_2O_5$ | 10.0 |
| Percent $K_2O$ | 15.6 |
| Percent $SO_3$ | 27.2 |
| Percent $SiO_2$ | 43.5 |

In order to observe the behavior of such catalysts while fluidized at high temperature, a 2 ft. length of 1¾" glass tube was mounted in a vertical tube furnace having a 1" slit covered with a flat glass plate and serving as an observation window. The bottom of the tube contained a sintered glass disc as a supporting grid for the fluidized bed and a preheater fo rthe fluidized gas was mounted directly under the column. Suitable thermocouples were inserted so that the temperature of the fluidizing gas and of the fluidized catalyst could be measured. The finely powdered catalyst was placed in the tube and its condition and the height of the bed were observed at various temperatures while air or nitrogen was passed through at approximately 0.6 liter per minute measured at normal temperature and pressure.

A properly fluidized bed appears rather homogeneous. The only detectable motion is that of individual particles in the bed and some disturbance at the top surface. As the fluidizability of the bed decreases, groups of particles move together and gas "bubbles" can be seen rising through the solid. The size of the bubbles appears to increase as the catalyst becomes more sticky and slugging occurs. At the same time, the bed height decreases. With a further decrease in fluidizability a point is reached where the bed collapses, resulting in a sharp decrease in bed height and no motion between particles. When this happens all of the air passes through more or less permanent holes in the bed of catalyst; the condition is unmistakably different from any fluidized condition.

It was observed that a catalyst which was fluid at a low temperature might stick at a higher one. This transition was reasonably reversible and reproducible with any given catalyst. Measurements of the "sticking temperature" were therefore made; they are reported as the highest temperature at which the bed could be maintained in a fluid condition.

Four samples of the above-described catalyst were used in these tests. Sample No. 1 was representative of the catalyst being used at the time in a commercial plant. Sample No. 2 was of the same catalyst after it had been regenerated by blowing with air at 340°–380° C. for about 60–70 hours; in this condition it was very sticky. Sample No. 3 was from a batch of unused plant catalyst. Sample No. 4 was from a batch that had been used for about 5000 hours for the oxidation of naphthalene to phthalic anhydride.

Each sample was tested in its oxidized and in its reduced form. Reductions were made by introducing 5% of ethylene into the fluidizing gas at 350°–400° C. for a short period of time. The samples were oxidized by simply fluidizing with air at the same temperature.

The results are given in Table 1.

*Table 1*

| Sample | Condition | Sticking Temp. |
|---|---|---|
| 1 | reduced | >420 |
| 1 | oxidized | <420 |
| 1 | oxidized + 1% silica gel | >450 |
| 2 | as received | 350 |
| 2 | oxidized | 325 to 350 |
| 2 | oxidized + 1.7% silica gel | 325 to 350 |
| 2 | reduced + 1.7% silica gel | 450 |
| 2 | oxidized + 1.7% silica gel | 350 to 370 |
| 2 | oxidized + 3.2% silica gel | >430 |
| 3 | oxidized | >450 |
| 3 | reduced | >450 |
| 4 | partially oxidized | <450 |
| 4 | reduced | >450 |

These results, particularly the comparison of sample No. 1 with sample No. 2, show that stickiness develops in the catalyst at lower temperatures as its age increases. This indicates that decrease in pore volume of the gel carrier is one of the principal causes of stickiness, since hydrous oxide gels such as silica gel are known to lose pore volume upon continued use. The results also show that the sticking temperature can be raised effectively by incorporating additional quantities of silica gel into the catalyst.

EXAMPLE 2

In order to show that the catalytic mixture of vanadium oxide and salt is responsible for the sticking effect, the following experiment was performed.

A sample of the catalyst described in Example 1, known to be sticky at 370° C., was sized with standard screens. The minus 200 mesh fraction was separated and saved. A sample of commercial powdered silica gel was then ground and screened and the portion passing through a 100 mesh screen and collecting on a 150 mesh screen was separated, dried and saved. These two screened fractions were then used to prepare a mixture containing 90% of the catalyst and 10% of the silica gel. A portion of this mixture was placed in a column and fluidized with nitrogen at 370°–400° C. for 14 hours. A second portion of the same mixture was thoroughly mixed mechanically without any heating.

The two samples were then screened to separate the components. The +200 mesh silica fraction from the control sample was white and apparently no different from the original silica gel. The same fraction from the heated samples had a bright orange color similar in appearance to fresh catalyst. Analysis of the orange colored silica gel showed that all the components of the salt phase had been transferred in significant amounts from the catalyst to the silica gel diluent. Upon analysis a +150 mesh sample of silica separated from the heated sample showed a content of 1.2% $V_2O_5$, 4.12% $K_2O$ and 9.46% $SO_3$ while silica from the control sample contained no detectable quantity of vanadium.

EXAMPLE 3

The pore volumes of the catalysts of Example 1 and of the silica gel were as follows:

*Table 2*

| Sample No.: | Pore volume, cc./g. |
| --- | --- |
| 1 | 0.06 |
| 2 | 0.01 |
| 3 | 0.25 |
| 4 | 0.02 |
| Silica gel | 0.40 |

The pore volumes of the catalysts correlate well with their stickiness. The most sticky sample (No. 2) had a practically zero pore volume. On the other hand the fresh catalyst, which was easily fluidized, had a relatively high pore volume of about 0.25 cc. per gram.

The above measurements represent the pore volume of the silica gel base minus the volume of the salt phase absorbed therein. Stickiness can be caused by expansion of the salt phase as the temperature rises or by contraction of the pore volume of the silica base, or both. It is also affected by absorption of sulfur trioxide when a sulfur-containing hydrocarbon such as naphthalene is being oxidized.

The mixture of vanadium oxide and potassium pyrosulfate has been extracted from a representative catalyst of Example 1 and melted. It becomes free flowing at about 320°–330° C. when fully oxidized. On reduction, its softening point is above 400° C. This explains why no sticking temperature was observed for those catalysts of Example 1 which were in the reduced state.

EXAMPLE 4

Tests were made in a laboratory converter on a sample of commercial catalyst having the composition described in Example 1, using 3 mol percent of napthalene in air. The results with undiluted catalyst were first established and then the behavior of the catalyst after adding first 15% and then a total of 30% of powdered silica gel was determined. Only the maximum yields are reported in the following table. The addition of silica gel did not raise the temperature of optimum yield in the catalyst and therefore there was no appreciable lowering of its tetravalent vanadium content. However, the additions of as much as 15% and 30% of silica gel decreased slightly the maximum yield of phthalic anhydride and the 30% addition also increased the naphthoquinone production. The results were as follows:

[10 foot bed with 6′3″ internal regeneration—10 seconds contact time]

| Catalyst | 100% Catalyst | 15% Silica Gel, 85% Catalyst | 30% Silica Gel, 70% Catalyst |
| --- | --- | --- | --- |
| PAA, Max. Wt. Percent | 103 | 100 | 98 |
| Naphthoquinone, Wt. Percent | 0.5 | 0.4 | 1.3 |
| Temperature, ° C | 355 | 355 | 355 |
| $V^{+4}$, Percent [1] | 2.4 | 2.6 | 3.0 |

[1] Corrected for dilution by silica gel.

EXAMPLE 5

A phthalic anhydride plant having a converter of the type shown in Fig. 1 of U.S. Patent No. 2,783,249 and containing approximately 180,000 lbs. of catalyst was operated continuously using a naphthalene-air mixture of about 2.5 to 3 mol percent of naphthalene and oxidation temperatures of about 335°–380° C. with continuous catalyst regeneration in the converter below the naphthalene inlet level.

About 10,000 lbs. of fresh catalyst were added every 2–4 weeks, a corresponding quantity of used catalyst being withdrawn from the converter. It was found that by replacing about 5–10% of this fresh catalyst with powdered silica gel the catalyst would remain in a well fluidized condition for the next 3–4 weeks, or until the next addition of catalyst was due.

A spray dried silica gel was used for this purpose having the following screen analysis

|  | Percent |
| --- | --- |
| Minus 100 mesh | 99 |
| Minus 200 mesh | 65 |
| Minus 325 mesh | 23 |
| Minus 40 microns | 16 |
| Minus 20 microns | 1 |

During the operating period when the total content of added silica gel in the catalyst was between about 1% and 10% the yield of phthalic anhydride in the converter product was between about 101 and 103 pounds per 100 pounds of naphthalene and the naphthoquinone formation was between about 0.2 and 0.5 pound. After the silica gel content of the catalyst passed 10% a lowering of the yield of phthalic anhydride to 100 lbs. and lower per 100 pounds of naphthalene was noted.

What we claim is:

1. A method for controlling the cohesiveness of the small particles of a fluidized bed of an oxidation catalyst containing a catalytic mixture of vanadium oxide and an alkali metal sulfate impregnated into the pores of a porous inorganic carrier during the time when said catalyst is in contact with vapors of an oxidizable organic compound being oxidized and with an oxidizing gas and at a temperature above about 300° C. at which said catalytic mixture is molten which comprises incorporating a powdered absorbent inert solid into said bed in a quantity sufficient to take up excess molten catalytic mixture exuded from said porous carrier and thereby maintaining the surfaces of the particles of the fluidized bed in a substantially dry condition.

2. A method for controlling the cohesiveness of the small particles of a fluidized bed of an oxidation catalyst containing a catalytic mixture of vanadium oxide and a potassium sulfate impregnated into the pores of a silica gel carrier during the time when said catalyst is in contact with the vapors of an oxidizable organic compound being oxidized and with an oxidizing gas and at a temperature above about 300° C. at which said catalytic mixture is molten which comprises incorporating a powdered inorganic silica gel into said bed in a quantity sufficient to take up excess molten catalytic mixture exuded from the pores of the silica gel carrier and thereby maintaining the surfaces of the particles of the fluidized bed in a substantially dry condition.

3. A method according to claim 2 in which the oxidizable organic compound is naphthalene and the oxidizing gas is air.

4. A method for controlling the cohesiveness of the small particles of a fluidized bed of a catalyst containing about 35% to 70% by weight of a silica gel impregnated with a catalytic mixture of about 20% to 50% of a potassium sulfate and about 3% to 25% of vanadium oxide during the time when said catalyst is in contact with a naphthalene-air mixture at a temperature within the range of about 320° C. to about 425° C. at which said catalytic mixture is molten which comprises incorporating a powdered absorbent inert solid into said bed in a quantity within the range of about 1% and 10% of the weight of said catalyst and sufficient to take up excess molten catalytic mixture on the surfaces thereof and thereby maintaining said surfaces in a substantially dry condition.

5. A method according to claim 4 in which the powdered absorbent solid is a silica gel.

6. In the vapor phase catalytic oxidation of oxidizable organic hydrocarbons by passing vapors thereof in admixture with an oxidizing gas upwardly through a fluidized bed of small particles of an oxidation catalyst containing a catalytic mixture of vanadium oxide and an alkali metal sulfate impregnated into the pores of a porous inorganic carrier and operating at a temperature above about 300° C. at which said mixture is molten, the improvement which comprises incorporating a powdered absorbent inert solid into said bed in a quantity sufficient to take up molten catalytic mixture exuded from the pores of said carrier and thereby maintaining the surfaces of the catalyst particles in a substantially dry condition and avoiding loss of fluidity caused by an increase in their cohesiveness.

7. In the catalytic oxidation of naphthalene to phthalic anhydride by passing a mixture of naphthalene vapor and air upwardly through a fluidized bed of a catalyst containing a catalytic mixture of about 5–15% by weight of vanadium oxide and about 35–50% of potassium pyrosulfate impregnated into about 35–60% of a silica gel carrier at a temperature within the range of about 320°–425° C. at which said catalytic mixture is molten, the improvement which comprises incorporating into said catalyst bed sufficient powdered silica gel to take up molten catalytic mixture exuded from the pores of said carrier and thereby maintaining the catalyst surfaces in a substantially dry condition and avoiding loss of fluidity caused by an increase in their cohesion.

References Cited in the file of this patent

UNITED STATES PATENTS

| | | |
|---|---|---|
| 1,836,325 | James | Dec. 15, 1931 |
| 2,471,853 | Beach et al. | May 31, 1949 |
| 2,698,330 | Fugate et al. | Dec. 28, 1954 |
| 2,783,249 | Jaeger et al. | Feb. 26, 1957 |
| 2,834,719 | Mosely et al. | May 13, 1958 |

OTHER REFERENCES

Kirk-Othmer: Encyclopedia of Chem. Tech., vol. 12 (1954), pp. 345–58 at pp. 345, 351 and 357.

Ortuno et al.: Chemical Abstracts, vol. 48 (1954), col. 11,677i.

Othmer: Fluidization (Reinhold, 1956), pp. 124–8.

Leva: Fluidization (1959), pp. 22–4.